United States Patent [19]

Patrick et al.

[11] Patent Number: 5,442,751
[45] Date of Patent: Aug. 15, 1995

[54] METHOD AND APPARATUS FOR PROCESSING DATA THROUGH A REGISTER PORTION BY PORTION

[75] Inventors: Stuart R. Patrick, Issaquah; Amit Chatterjee, Redmond, both of Wash.

[73] Assignee: Microsoft Corporation, Redmond, Wash.

[21] Appl. No.: 150,411

[22] Filed: Nov. 9, 1993

[51] Int. Cl.$^6$ ............................................. G06F 13/00
[52] U.S. Cl. ..................... 395/250; 364/939; 364/239
[58] Field of Search ............... 395/800, 725, 775, 250, 395/375

[56] References Cited

U.S. PATENT DOCUMENTS

4,376,933  3/1983  Saran .......................... 340/347 DD

*Primary Examiner*—David Y. Eng
*Attorney, Agent, or Firm*—Klarquist Sparkman Campbell Leigh & Whinston

[57] ABSTRACT

A method for fetching data in the form of a group of source bits (bytes, words, etc.) from computer memory and providing successive portions of the group to a computer process. An indicator such as a bit string is loaded into one location of a register and the group of source bits is loaded into another location in the register. The contents of the register are then rotated to move successive portions of the group into a register location where the portions can be accessed for a process. Tracking the processing of the successive portions of the bit group is handled efficiently in a loop through monitoring of the indicator, which "walks" through the register concurrently with movement of the successive portions of the source bit group. When the indicator bit has returned to its initial register location, the processing of the group of source bits is complete. The method may be applied where it is desirable to process bytes, words or other groups of bits in smaller portions, such as in image processing for expanding a one bit per pixel image to a multibit per pixel image.

21 Claims, 6 Drawing Sheets

METHOD AND APPARATUS FOR PROCESSING DATA THROUGH A REGISTER PORTION BY PORTION

FIELD OF THE INVENTION

This invention relates to techniques for fetching data such as bytes or other groups of bits from computer memory and then processing the data in smaller portions than the fetched group. More particularly, this invention relates to the application of such a technique to image processing, such as in color expanding a one bit per pixel image to multibit per pixel image.

BACKGROUND OF THE INVENTION

The need to process bits in a fewer number than they are fetched from computer memory may arise in many applications. With many microprocessors such as the Intel 80386 or 80486, for instance, bits may be fetched from memory or otherwise manipulated in groups of eight bits, 16 bits or 32 bits. But often it is preferable or necessary to further process the bits singly, in pairs or in other portions of the fetched group.

A good example of this need is in the process for converting a one bit per pixel image to a different format, such as converting a monochrome image into a color image. Such conversion occurs in the process of colorizing fonts, icons or cursors that are initially constructed as one-bit per pixel images. A prior technique for converting a monochrome image to a multibit image is shown in the assembly language code in Table 1 below:

TABLE 1

```
; ds:esi →            points to the source
                      bytes to convert
; es:edi →            points to the
                      destination surface
; edx    →            number of bytes to
                      convert.
; fs:Color Expand Table →   prebuilt color convert
                      table to convert any
                      possible sequence of
                      2 bits to 2 WORDS
                      {DWORD}
OuterLoop:
    mov  bl,[esi]     ;get one source byte
                      [= 8 pixels of 1 bit
                      each]
    inc  esi          ;point to next source
                      byte
    ror  ebx,8        ;get the byte into the
                      high byte of EBX.
    mov  ch,4         ;4 sets of two bits
                      each of source data
InnerLoop:
    xor  bl,bl        ;initialize (clear out
                      any existing bits)
    rol  ebx,2        ;get the next two bits
                      into bl.
    shl  bx,2         ;multiply by 4 to
                      access a DWORD
                      table
    mov  eax, fs:ColorExpandTable[bx]  ;expand the two bits to
                      a DWORD
    stosd             ;store the 2 color
                      converted pels
    dec  ch           ;one more set of two
                      bits done.
    jnz  InnerLoop    ;continue if there are
                      more pairs of bits to
                      do.
    dec  edx          ;one more byte of the
                      source done.
    jnz  OuterLoop    ;do all the bytes in
```

TABLE 1-continued the source.

With this technique, eight-bit bytes (source bytes) of the one-bit per pixel images are divided into two-bit portions. These two-bit portions form an index to a 4 entry color expand table which expands each bit to 16 bits. Each entry in the color expand table is thus 32 bits. The CH portion of the ECX register is set to four and decremented after each two-bit portion is expanded. A new source byte is fetched after the prior source byte is completely expanded.

The drawbacks of this and similar prior techniques are twofold. First, they require a register or memory location for keeping count of the number of two-bit portions processed. Using a register consumes a limited resource. On the other hand, a memory location is much slower to access and its use adds considerable delay. Second, these techniques require the register or memory location to be initialized each time a new source byte is processed. This initialization requires a step that must be executed thousands of times in the process of converting a one-bit image to a multibit image, adding unwanted delay.

An object of this invention, therefore, is to provide an improved method for fetching a group of bits from computer memory and providing portions of the group to a computer process. Another object is to provide such a method that requires fewer instructions and fewer registers or memory locations than prior methods. More particularly, an object of this invention is to provide such a method for expanding a fewer-bit per pixel image to a greater-bit per pixel image.

SUMMARY OF THE INVENTION

In accordance with the invention, a method for fetching a group of bits from memory and providing portions of the group to a process begins by loading a fetched group of source bits into a first location in a register and providing an indicator in a second location in a register. The indicator and source bit group are then shifted to other register locations. These initial steps "prime" the inner loop of the method by suitably positioning the indicator. The method proceeds by shifting the indicator towards its initial register location and a portion of the source bit group into the first register location. The portion of the source bit group is then acted upon by the process. The method then checks the indicator to determine if it has returned to its initial register location. If it has not, the steps of shifting, providing and checking are repeated until the indicator has returned, thereby indicating that all portions of the source bit group have been shifted into the first register location and provided to the process.

In the preferred embodiment, the source bit group may be a byte initially loaded into the lowest byte of a four-byte general purpose register, such as the BL register portion of the EBX register in a 80386 family microprocessor. The indicator may be a bit string loaded into the highest byte of the EBX register. The contents of the EBX register are then rotated to place the indicator in an adjacent register location and the source bit group in the highest byte location. For processing, the contents of the register are again rotated to shift successive portions of the source bit group back into the BL register. The process acts upon each portion while it is in the BL register.

If the process is converting a one bit per pixel image to a multibit per pixel image, a color expand table may be provided in the present embodiment of the invention. The portion of the source bit group in the BL register forms the address to the color expand table, which converts the portion into corresponding multiple destination bits for screen memory.

The foregoing and other objects, features, and advantages of the invention will become more apparent from the following detailed description of a preferred embodiment which proceeds with reference to the accompanying drawings.

DETAILED DESCRIPTION OF A PREFERRED EMBODIMENT

A preferred embodiment of the invention is implemented in machine code executable on an Intel 80386 or 80486 microprocessor for the purpose of converting a one bit per pixel image to a 16 bit per pixel image. However, as will be apparent to one of skill in the art, the invention can otherwise be embodied on other computer systems for other applications. It should be understood, therefore, that this description is not intended as a limit on the scope of the invention but only as one enabling example of one embodiment of the invention.

Figure 1:
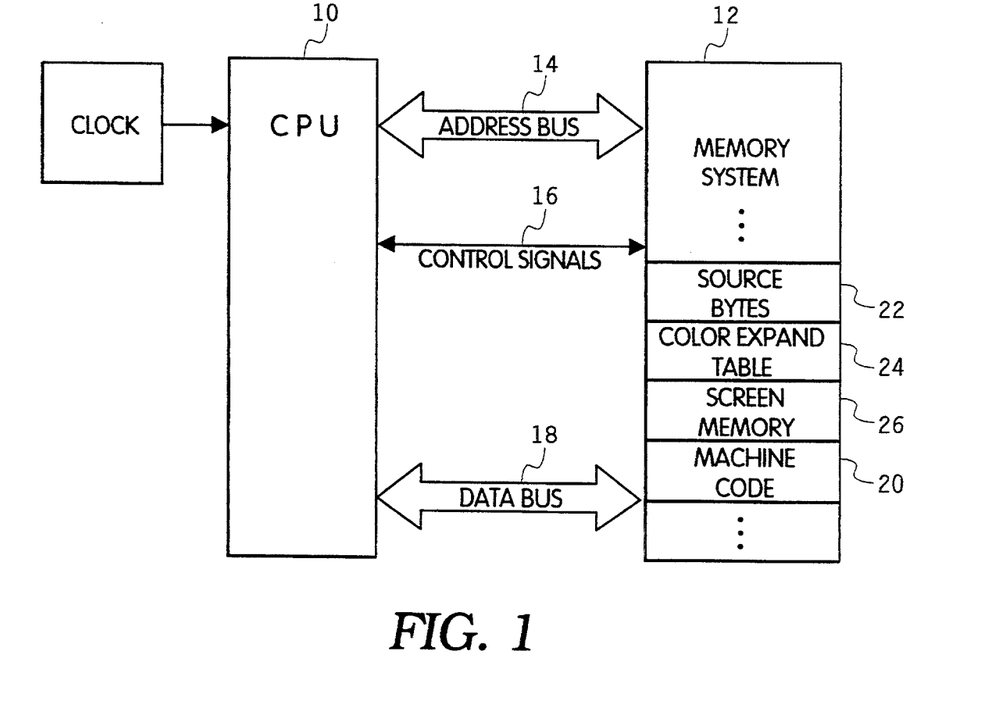
FIG. 1 is a block diagram of a conventional interface between a CPU such as a microprocessor and a memory system such as RAM and ROM.

Referring to FIG. 1, a block diagram of a conventional interface between a CPU 10 such as a microprocessor and a memory system 12 such as RAM, ROM and other storage devices is shown. CPU 10 and memory system 12 communicate via an address bus 14, control signals 16 and a data bus 18. Machine code 20 of the preferred embodiment resides in memory system 12 and is executed in conventional fashion by CPU 10. Also somewhere within memory system 12 are source bytes 22, a color expand table 24 and screen memory 26.

Figure 2:
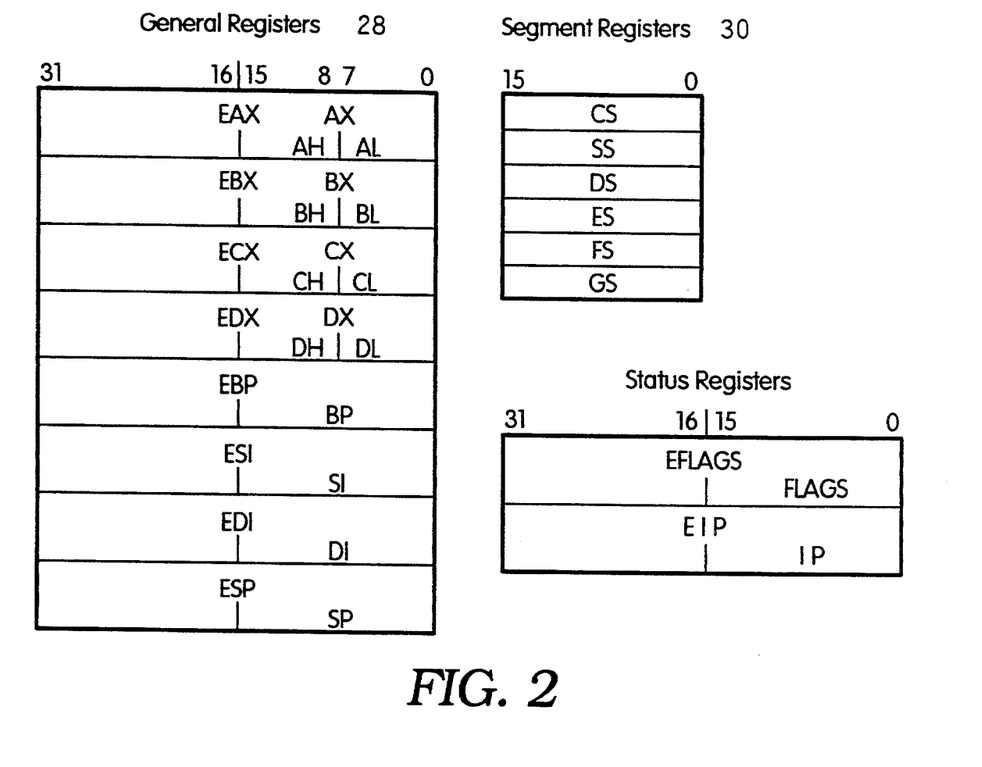
FIG. 2 is a block diagram of a number of the registers found within a conventional microprocessor.

FIG. 2 is a block diagram of a number of the registers found within CPU 10, which in the present embodiment is an Intel 80836 or 80486 microprocessor. As will be described, several of these registers are used in the preferred embodiment in accordance with the method of the invention. For clarity, these microprocessor may be referred to as "30386 family" microprocessors since these registers are the same in each microprocessor. General registers 28 are 32 bits wide and segment register 30 are 16 bits wide. Eight bits will be referred to herein as a byte, a group of two bytes is referred to as a word and a group of four bytes is referred to as a double word (dword). However, these terms are not limited to this definition and may be used to refer to other-sized groups of bits. The general registers thus each store four eight-bit bytes, two words or one dword. In 80836 family microprocessors, selected locations, or portions, of general registers EAX, EBX, ECX, and EDX may be addressed. The lower 16 bits (word) of the EBX register, for example, can be accessed as the BX register. The upper eight bits (byte) of the BX register can be accessed as the BH register and the lower eight bits (byte) as the BL register. The segment registers 30 hold values that affect which portions of memory system 12 a program uses. Further information on these registers and the instruction set of the 80386 family of microprocessors is widely available from a number of publications, such as *Microsoft's 80386/80486 Programming Guide* by Ross Nelson (Microsoft Press 1991).

Figure 3:
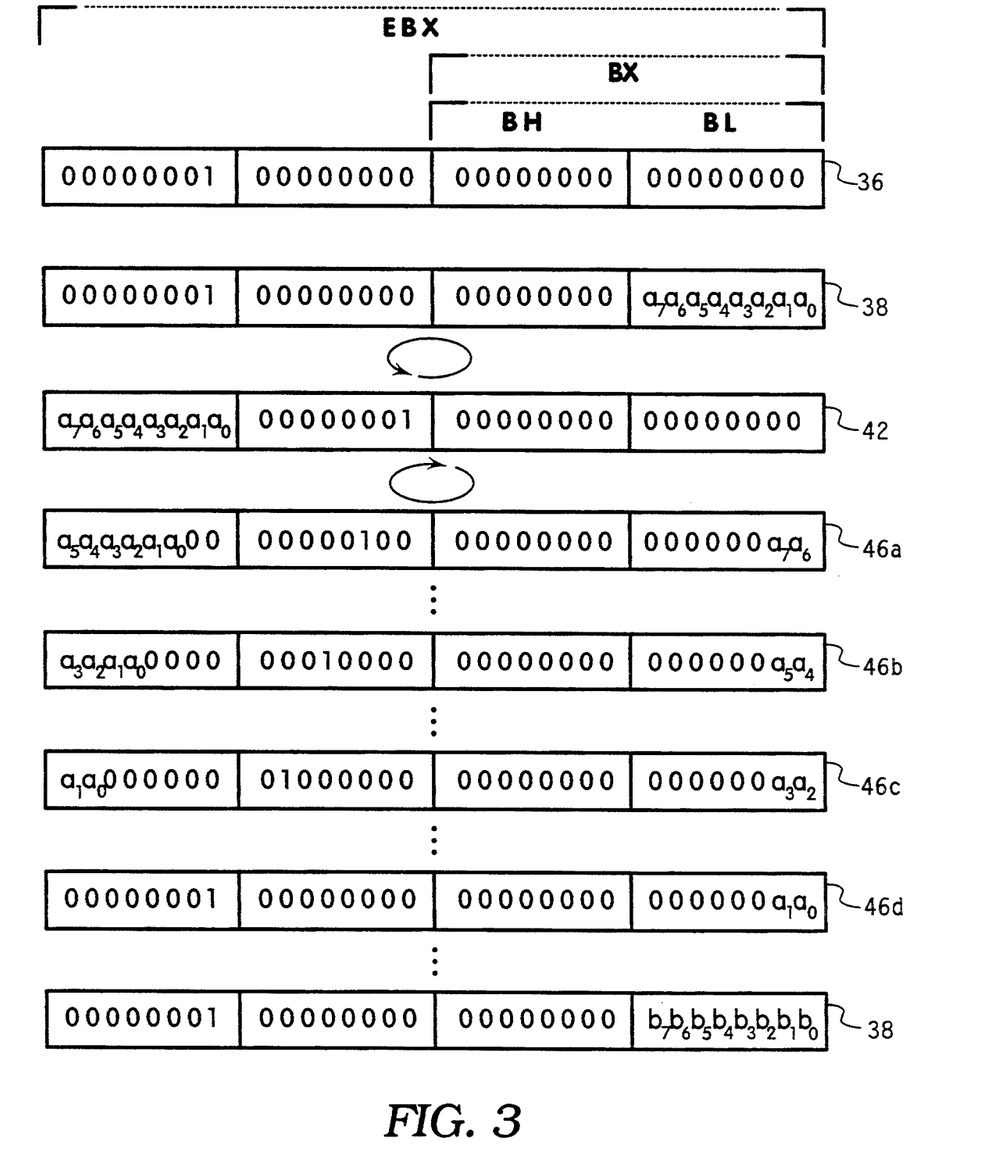
FIG. 3 is a series of views of a register of FIG. 2 showing how data is manipulated within the register by a method in accordance with the invention.
Figure 4:
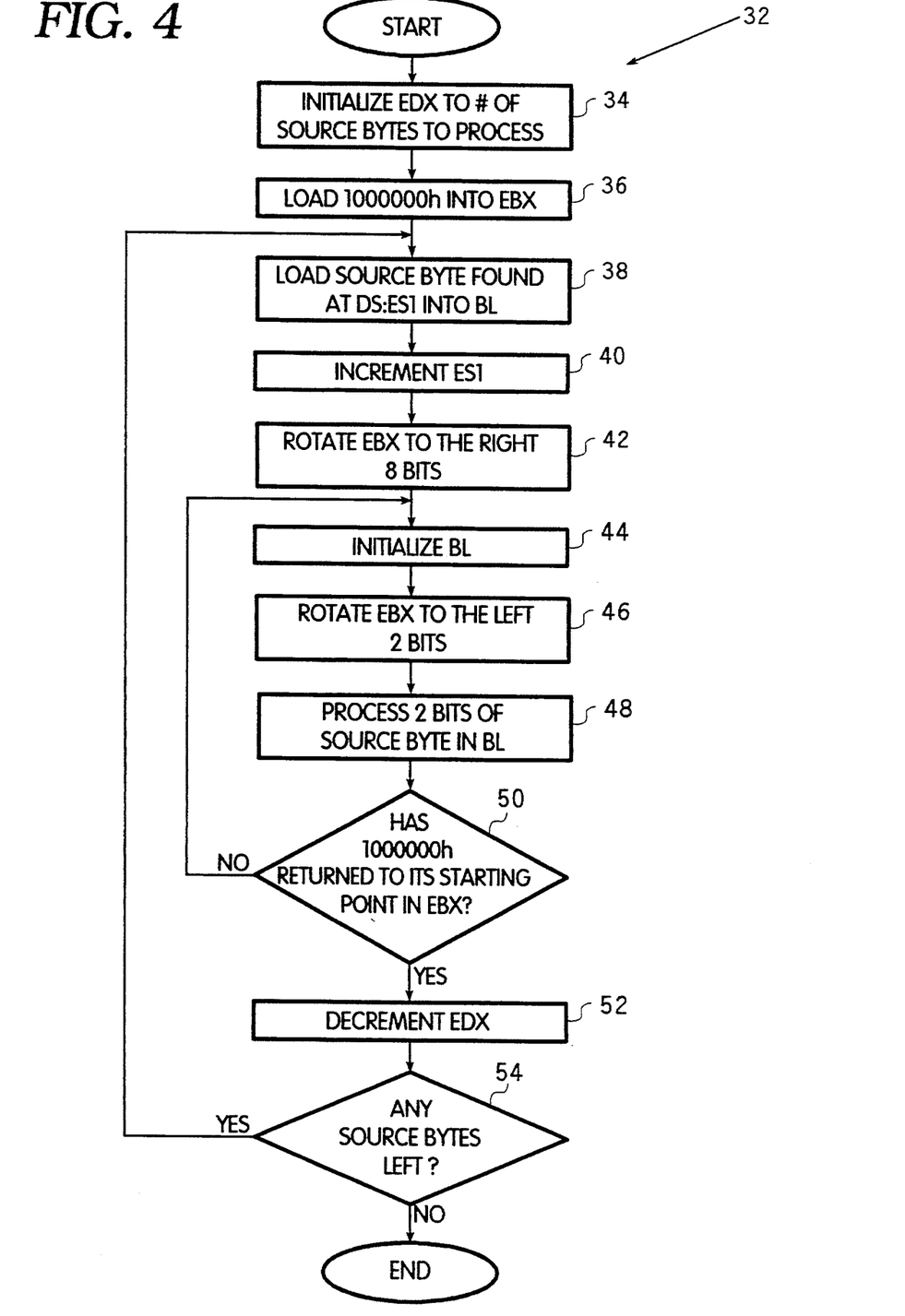
FIG. 4 is a flow chart of a method according to the invention for fetching a group of bits from memory and then providing portions of the group to a process.

In a preferred embodiment of the invention, the EBX register shown in FIG. 3 is used in accordance with a method 32 shown in FIG. 4. The method 32 fetches a group of source bits from memory and provides portions of group to a process, preferably successive portions. The corresponding assembly language code for the method 32 is shown in Table 2 below:

TABLE 2

| ; ds:esi → | | points to the source bytes to convert |
|---|---|---|
| ; es:edi → | | points to the destination surface |
| ; edx → | | number of bytes to convert |
| ; fs:Color Expand Table → | | prebuilt color convert table to convert any possible sequence of 2 bits to 2 WORDS {DWORD} |
| mov | ebx,1000000h | ;load "walking 1" at the start of the 4th byte |
| OuterLoop: | | |
| mov | bl,[esi] | ;get one source byte [= 8 pixels of 1 bit each] |
| inc | esi | ;point to next source byte |
| ror | ebx,8 | ;get the byte into the high byte of EBX. Walking 1 goes to start of 3rd byte |
| InnerLoop: | | |
| xor | bl,bl | ;initialize (clear out any existing bits) |
| rol | ebx,2 | ;get the next two bits into bl. Walking 1 moves two bits to left |
| shl | bx,2 | ;multiply by 4 to access a DWORD table |
| mov | eax, fs:ColorExpandTable[bx] | ;expand the two bits to a DWORD |
| stosd | | ;store the 2 color converted pels |
| test | ebx,1000000h | ;has walking 1 moved to start of 4th byte ? |
| jz | InnerLoop | ;no, there are more bit pairs to do |
| dec | edx | ;one more byte of the source done |
| jnz | OuterLoop | ;do all the bytes in the source |

In the preferred embodiment of the invention, machine code 20 corresponding to the assembly language procedure in Table 2 forms a portion of a program loaded into memory system 12.

Before the method 32 is executed, memory locations within memory system 12 are allocated for source bytes 22, color expand table 24 and screen memory 26. FIG.

Figure 6A:
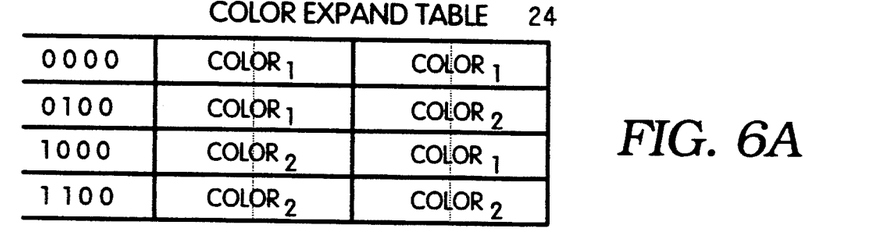
FIG. 6a–6c are block diagrams of portions of the memory system of FIG. 1 showing a color expand table, screen memory and a source of bytes.
Figure 6B:
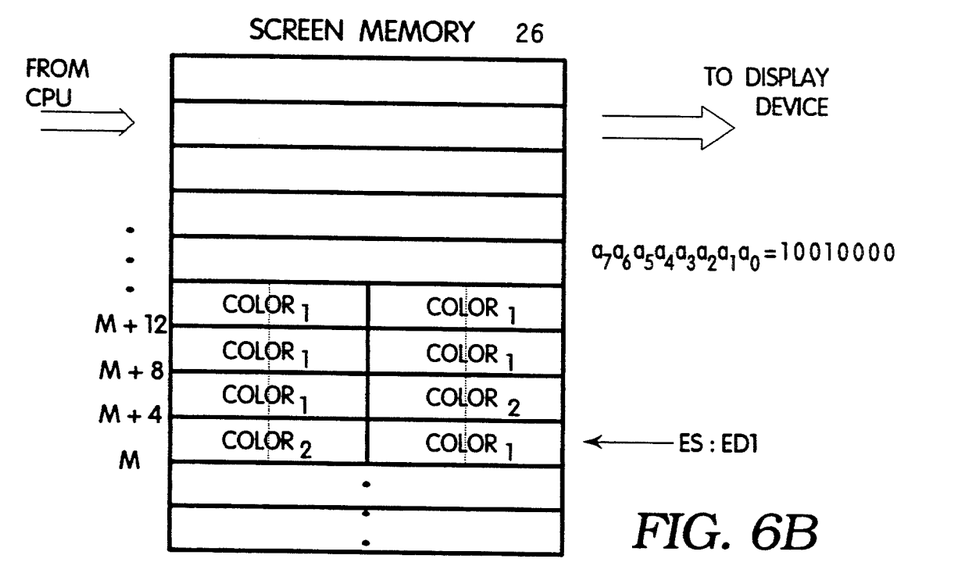
Figure 6C:
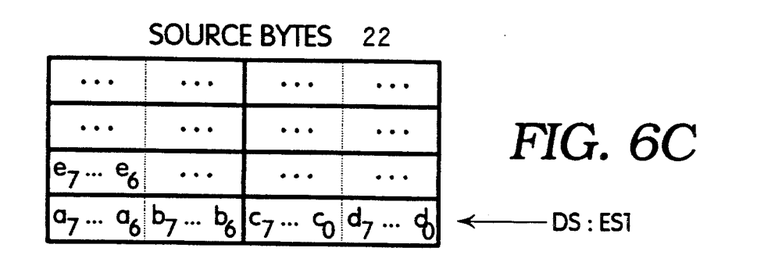

6C shows one possible arrangement of the source bytes 22 in double words. FIG. 6A shows one possible arrangement of the color expand table 24, which is constructed before execution of the method 32. Color table 32, which determines what color each bit of a source byte is converted to, may be changed as desired.

With reference now to FIGS. 3 and 4, the method 32 begins with the step 34 of initializing the EDX register to the number of source bytes to process. In the present embodiment, this process is conversion of each source bit to 16 destination bits stored in color expand table 24. However, the process could be of any type.

The next step 36 is to load an indicator such as the 1 bit in the double word 100000 hex into the EBX register. As shown in FIG. 3, this step places a 1 as an indicator in the 24th bit position of register (the upper byte location of the register) and 0 bits in all other bit locations.

Steps 34 and 36 complete the initialization of the method 32, which now enters an outer loop. In step 38, a group of source bits such as byte $a_7a_6a_5a_4a_3a_2a_1a_0$ found at ES:ESI is fetched from memory and loaded into the BL portion of the EBX register. Because of the nature of the EBX register, this operation does not affect the 1 bit in the 24th bit location, as shown in FIG. 3. In step 40, The ESI register is then incremented to point to the next source byte for the next time the method 32 enters the outer loop.

The next step 42 "primes" the inner loop of method 32 by shifting the 1 bit from the 24th bit location to another position such as the 16th bit location of the EBX register (the start of the third byte location). Specifically, step 42 rotates the contents of the EBX register eight bit positions to the right. This step moves the 1 bit out of its initial register location into the 16th bit position. It also moves the source byte $a_7a_6a_5a_4a_3a_2a_1a_0$ out of its initial location into the fourth byte location of the EBX register. Step 42 is illustrated in FIG. 3.

The method 32 now enters an inner loop that includes steps 44 through 50. As will be seen, each time the instructions of the inner loop are executed, the 1 bit "walks" two bit positions to the left towards the fourth byte location of the EBX register. After the fourth execution of the inner loop, the "walking 1" is back in the 24th bit position of the EBX register and the method 32 exits the inner loop. This exit completes the processing of a particular source byte and also "reloads" the 1 bit. The method 32 then proceeds again through the outer loop with a new source byte.

Referring now to steps 44 through 50 more particularly, the BL portion of the EBX register is initialized to zero to clear any existing bits from its contents (step 44). The contents of the EBX register are then rotated two bit positions to the left (step 46). As shown in FIG. 3, this rotation accomplishes two objectives. First, it "strips" two bits from the source byte and places them in the BL portion of the EBX register, ready for processing. Second, it "walks" the 1 bit two positions to the left to track the processing of the two bits. The two bits are then provided to a process (step 48) and the 1 bit is checked to determine if it has returned to its starting point at the 24th bit position (step 50). In the present embodiment, the decision at step 50 remains negative until all four two-bit portions of the source byte have been provided to the process. The 1 bit moves an additional two bit positions to the left each of the four times the method 32 repeats the steps of the inner loop. This movement is illustrated as steps 46a through 46d in FIG. 3.

Once the processing of a source byte is complete, the method 32 exits the inner loop, decrements the EDX register (which holds the count of the number of source bytes remaining to be processed) and checks the EDX register to determine if there are further source bytes to process (steps 52, 54). If so, the method loops back to step 38 and loads the next source byte, $b_7b_6b_5b_4b_3b_2b_1b_0$, into the BL portion of the EBX register. Steps 40 through 54 are then executed again. However, there is no need to load the predetermined bit pattern 1000000 hex into the EBX register again (step 36) because the pattern has "reloaded" itself in the manner described. The method 32 then continues until the EDX register indicates that there are no more source bytes to process.

Figure 5:
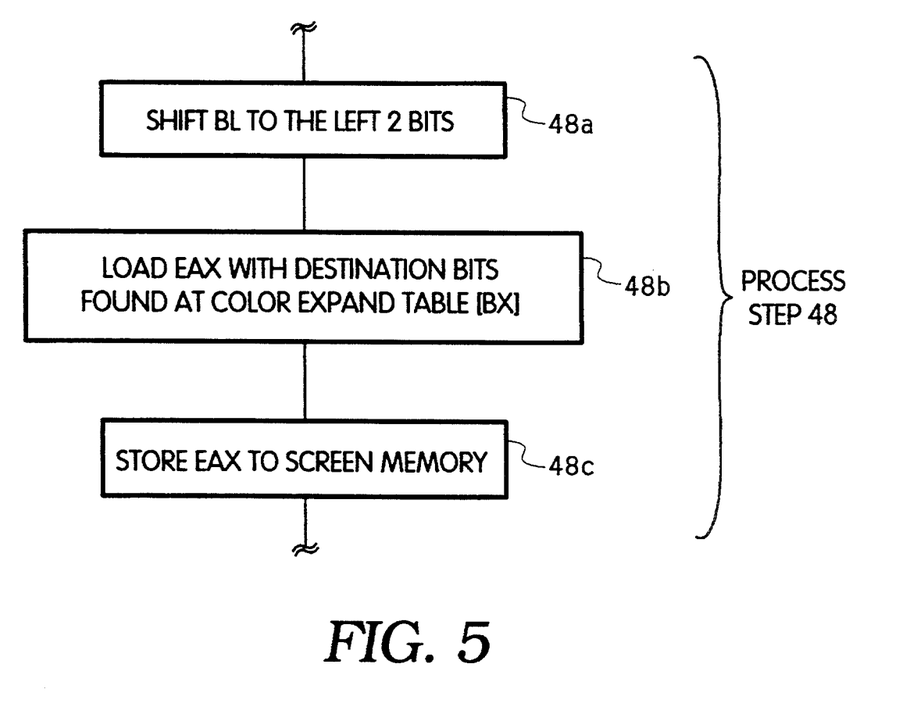
FIG. 5 is a flow chart of an example of a process referred to in FIG. 4.

In the present embodiment, the process represented by step 48 is used for expanding a fewer bit per pixel image (such as one bit) to a greater bit per pixel image (such as multibit). The particular steps for this expansion are shown in FIG. 5. In step 48a, the two bits of the source byte are individually shifted to the left in the BL portion of the EBX register, effectively multiplying the bits by four. This multiplication is necessary because the two bits address four bytes in the color expand table 24, and thus each address must be spaced four memory locations apart. An example of the color expand table 24 is shown in FIG. 6A. Each line of the table 24 represents a double word, or four bytes of destination bits. The solid division line divides the words of the double word, and the dotted line is between the bytes in each word. $Color_1$ and $color_2$ are 16-bit (word) representations of a color for each of two possible values of each source bit.

In step 48b, the EAX register is loaded with the destination bits corresponding to the two bits of the source byte in the BL portion of the EBX register. For example, if the $a_7a_6$ bits are 10 binary, then they form the address 1000 binary to the third row of the color expand table 24. There, a 1 bit converts into $color_2$ destination and a 0 bit converts into $color_1$ destination bits. These 32 destination bits are then read from the table 24 into the EAX register.

In step 48c, the destination bits in the EAX register are stored into screen memory 26, which is pointed to by ES:EDI. FIG. 6B illustrates the contents of screen memory after the conversion of source byte $a_7a_6a_5a_4a_3a_2a_1a_0$, which equals 10010000 binary.

Having described and illustrated the principles of our invention with reference to a preferred embodiment, it will be recognized that the embodiment can be modified in arrangement and detail without departing from such principles. For example, the indicator may be a string of one or more bits and may be in a pattern other than 1000000 hex. Other locations that the 24th bit position maybe checked. The portions of the source bit group may be two, four or other lengths. The invention may be used with other registers and microprocessors than those illustrated. And the invention may be used in many applications other than image processing, wherever efficient control of an inner loop is desired.

In view of the many possible embodiments to which the principles of our invention may be put, it is emphasized that the detailed embodiments described herein are illustrative only and should not be taken as limiting the scope of our invention. Rather, we claim as our invention all such embodiments as may come within the scope and spirit of the following claims and equivalents thereto.

We claim:

1. A method for fetching a group of source bits from memory and providing portions of the group to a process, comprising:

providing a register having first and second register locations and adjacent register locations;

loading the fetched group of source bits as contents of the first register location;

providing an indicator as contents of the second register location;

shifting the contents of the register to move the indicator from the second register location into an adjacent register location and the source bit group from the first register location into an adjacent register location; and performing the following steps:

shifting the contents of the register to cause the indicator to move from its adjacent register location toward the second register location and to cause a portion of the source bit group to move from its adjacent register location into the first register location;

providing the portion of the source bit group in the first register location to a process;

checking to determine if the indicator has returned to the second register location; and if not, repeating the shifting, providing and checking steps until the indicator has returned to the second register location, thereby indicating that all portions of the source bit group have been moved into the first register location and provided to the process.

2. The method of claim 1 wherein the step of shifting the contents of the register to move the indicator into an adjacent register location and the source bit group into an adjacent register location comprises rotating the contents of the register.

3. The method of claim 1 wherein the step of shifting the contents of the register to cause the indicator to move toward the second register location and to cause a portion of the source bit group to move into the first register location comprises rotating the contents of the register.

4. The method of claim 1 including loading a second group of source bits into the first register location after the indicator has returned to the second register location.

5. The method of claim 1 wherein the register is a general purpose register of the 30386 family of microprocessors.

6. The method of claim 1 wherein the indicator is a predetermined bit string.

7. The method of claim 1 wherein a portion of the source bit group comprises two bits.

8. The method of claim 1 wherein a portion of the source bit group comprises four bits.

9. The method of claim 1 wherein a source bit group is a byte.

10. An apparatus for fetching a group of source bits from memory and providing portions of the group to a process, comprising:

a register having first and second register locations and adjacent register locations;

means for loading the fetched group of source bits as contents of the first register location;

means for providing an indicator as contents of the second register location;

means for shifting the contents of the register to move the indicator from the second register location into an adjacent register location and the source bit group from the first register location into an adjacent register location; and means for performing the following steps:

shifting the contents of the register to cause the indicator to move fromits adjacent register location toward the second register location and to cause a portion of the source bit group to move from its adjacent register location into the first register location;

providing the portion of the source bit group in the first register location to a process;

checking to determine if the indicator has returned to the second register location; and if not, repeating the shifting, providing and checking steps until the indicator has returned to the second register location, thereby indicating that all portions of the source bit group have been moved into the first register location and provided to the process.

11. The apparatus of claim 10 wherein the means for shifting the contents of the register move the indicator into an adjacent register location and the source bit group into an adjacent register location comprises means for rotating the contents of the register.

12. The apparatus of claim 10 wherein the means for shifting the contents of the register to cause the indicator to move toward the second register location and to cause a portion of the source bit group to move into the first register location comprises means for rotating the contents of the register.

13. A method for expanding a fewer-bit per pixel image to a greater-bit per pixel image, comprising:

providing a register having first and second register locations and adjacent register locations;

providing a table in memory for converting source bits in the fewer-bit per pixel image into corresponding larger groups of destination bits in a greater-bit per pixel image;

storing a group of source bits as contents of one register location;

storing an indicator as contents of another register location; and performing the following steps:

shifting the contents of the register to cause the indicator to move from the other location toward the second register location and to cause a portion of the source bit group to move from the one location into the first register location;

addressing the table with the portion of the source bit group in the processing location to convert the portion into a larger group of corresponding destination bits for a pixel in the image;

checking to determine if the indicator has reached the second register location; and if not, repeating the shifting, addressing and checking steps until the indicator has reached the second register location, thereby indicating that all portions of the source bit group have been moved into the first register location and converted to groups of corresponding destination bits.

14. The method of claim 13 wherein the step of shifting the contents of the register to cause the indicator to move toward the second register location and to cause a portion of the source bit group to move into the first register location comprises rotating the contents of the register.

15. The method of claim 13 wherein the addressing step includes multiplying the portion of the source bit group in the first register location by a number to transform the portion into an address suitable for the table.

16. The method of claim 13 including storing a second group of source bits into the one register location after all portions of a first group of source bits have been converted and moving the indicator back to the other register location prior to processing the second group of source bits.

17. The method of claim 13 including storing the groups of corresponding destination bits to video memory as the destination bits are provided by the table.

18. The method of claim 13 wherein the fewer-bit per pixel image has a single bit per pixel.

19. The method of claim 13 wherein a corresponding group of destination bits comprises 16 bits per source bit.

20. The method of claim 13 wherein the table comprises four entries of 32 bits each, each entry corresponding to two source bits.

21. An apparatus for expanding a fewer-bit per pixel image to a greater-bit per pixel image, comprising:

a register having first and second register locations and adjacent register locations:

a table in memory for converting source bits in the fewer-bit per pixel image into corresponding larger groups of destination bits in a greater-bit per pixel image;

means for storing a group of source bits as contents of one register location;

means for storing an indicator as contents of another register location; and means for performing the following steps:

shifting the contents of the register to cause the indicator to move from the other location toward the second register location and to cause a portion of the source bit group to move from the one location into the first register location;

addressing the table with the portion of the source bit group in the first register location to convert the portion into a larger group of corresponding destination bits for a pixel of the image;

checking to determine if the indicator has reached the second register location; and if not, repeating the shifting, addressing and checking steps until the indicator has reached the second register location, thereby indicating that all portions of the source bit group have been moved into the first register location and converted to groups of corresponding destination bits.

* * * * *